United States Patent
Ehling

(10) Patent No.: US 6,906,512 B2
(45) Date of Patent: Jun. 14, 2005

(54) MAGNETOSTRICTIVE POSITION MEASURING METHOD AND SYSTEM FOR CHANGING A DURATION OF A NEXT EXCITATION PULSE AS A FUNCTION OF THE ASCERTAINED POSITION OF THE MAGNET AND THE ASSOCIATED EXCITATION PULSE CORRECTIVE VALUE

(75) Inventor: Ernst Ehling, Neuhausen (DE)

(73) Assignee: Horst Siedle GmbH & Co., KG, Furtwangen (DE)

( * ) Notice: Subject to any disclaimer, the term of this patent is extended or adjusted under 35 U.S.C. 154(b) by 206 days.

(21) Appl. No.: 10/325,843

(22) Filed: Dec. 23, 2002

(65) Prior Publication Data

US 2003/0146747 A1 Aug. 7, 2003

(30) Foreign Application Priority Data

Dec. 24, 2001 (DE) .......................... 101 64 121

(51) Int. Cl.[7] .............................. G01B 7/14; G01R 33/02
(52) U.S. Cl. .......................... 324/207.13; 324/207.12
(58) Field of Search .................. 324/207.12, 207.13, 324/207.24, 225; 73/313, 314; 703/85, 94, 97, 104

(56) References Cited

U.S. PATENT DOCUMENTS 5,923,164 A * 7/1999 Ehling et al. .......... 324/207.13

6,351,117 B1 * 2/2002 Ehling ................ 324/207.13

FOREIGN PATENT DOCUMENTS

DE 19954328 A1 2/2002

* cited by examiner

*Primary Examiner*—Jay Patidar
(74) *Attorney, Agent, or Firm*—Harness, Dickey & Pierce, P.L.C.

(57) ABSTRACT

A magnetostrictive position measuring system is provided with a waveguide and which is allocated with a magnet movable along the waveguide. An impulse generator for generating an excitation pulse and a conductive wire for guiding the excitation pulse through the waveguide to the magnet are provided, whereby a torsion wave arises in the waveguide when the excitation pulse reaches the magnet. A reel for generating a reply pulse as a function of the torsion wave and a position calculation unit for ascertaining the position of the magnet as a function of the excitation pulse and the reply pulse are provided. A processor is provided in which a table is present in which a large number of positions and excitation pulse correction values are allocated to one another. The duration of the next excitation pulse is altered as a function of the position of the magnet ascertained and the associated excitation pulse correction value from the table.

16 Claims, 2 Drawing Sheets

MAGNETOSTRICTIVE POSITION MEASURING METHOD AND SYSTEM FOR CHANGING A DURATION OF A NEXT EXCITATION PULSE AS A FUNCTION OF THE ASCERTAINED POSITION OF THE MAGNET AND THE ASSOCIATED EXCITATION PULSE CORRECTIVE VALUE

The present application hereby claims priority under 35 U.S.C. §119 on German patent application number 101 64 121.4 filed Dec. 24, 2001, the entire contents of which are hereby incorporated herein by reference.

FIELD OF THE INVENTION

The present invention generally relates to a magnetostrictive position measuring method for determining the position of a magnet where the magnet is movable along a wave guide in which an excitation pulse is generated and is passed through the wave guide to the magnet, in which a torsion wave arises in the wave guide when the excitation pulse reaches the magnet, in which a reply pulse is generated as a function of the torsion wave, and in which the position of the magnet is ascertained as a function of the excitation pulse and the reply pulse. The present invention also generally relates to a corresponding magnetostrictive position measuring system.

BACKGROUND OF THE INVENTION

A position measuring method or position measuring system is known from DE 199 54 328 A1. There a waveguide is present in the longitudinal direction of which an object coupled with a magnet can be slid. A torsion wave is generated in the waveguide on the basis of an excitation pulse striking upon the magnetic field of the magnet. A reel is provided to derive a reply pulse from the torsion wave. The position of the object along the wave guide is inferred from the time between the excitation pulse and the reply pulse.

The excitation pulse is triggered by an external interrogation pulse with which the position of the object is queried. Since after the interrogation pulse arrives a certain period of time is necessary for conducting the previously described ascertainment of the position of the object, the ascertained position is calculated in advance at the current point in time of the interrogation pulse. For this, the last ascertained and stored positions of the object are adduced and taken into consideration, for example using linear extrapolation.

Owing to the non-linear character of the waveguide, the position calculated beforehand must be corrected. For this, a table is present in DE 199 54 328 A1, in which an associated correction factor is contained at any ascertained position. The correction factors are moreover determined from the start using highly exact measurements of positions of the object. The correction factors relate to the ascertained positions of the object and consequently correct this result of the known position measuring system.

The position of the object corrected in this way is finally converted into a period of time and output with the aid of a start and a stop impulse.

The disadvantage of the described magnetostrictive position measuring method or system includes among other things in that the minimum period of time in which interrogation pulses can be processed depends upon the time necessary for correction of the ascertained position.

SUMMARY OF THE INVENTION

An object of the present invention is to create a magnetostrictive position measuring method and a corresponding position measuring system which allows shorter time intervals between the individual interrogation pulses.

In accordance with an embodiment of the present invention a large number of positions and of excitation pulse corrections are allocated to one another, and in that the duration of the next excitation pulse is altered as a function of the ascertained position of the magnet and the associated excitation pulse correction value from the table.

Moreover, an embodiment of the present invention provides a processor in which a table is present in which a great number of positions and excitation pulse correction values are allocated to one another, and that resources are provided which alter the duration of the next excitation pulse as a function of the ascertained position of the magnet and the associated excitation pulse correction value from the table.

Accordingly, it is not the position of an object ascertained by the position measuring system which is corrected, but it is rather the trigger of the measurement, namely the excitation pulse, which is corrected. The result of the measurement, namely the position of the object, must therewith no longer be corrected or matched or influenced in any other way.

From this, there results the advantage that the position of the object ascertained by the position calculation unit can be used further immediately. The time necessary for a correction is therewith saved. This at the same time represents a shortening of that minimal period of time which is required for ascertaining a position of the object.

The correction of the excitation pulse can be conducted completely independently of the further use of the ascertained position of the object. The time required for this consequently has no influence on the ascertainment of the position mentioned and/or its further use.

This has as a consequence that the minimum period of time in which interrogation pulses can be processed no longer depends on the time required for correction of the ascertained position. This leads to the possibility that with the position measuring system of the invention, shorter time intervals between the individual interrogator impulses can be allowed.

It is especially advantageous if resources are provided for shortening or lengthening the duration of the next excitation pulse. In this way, corrections in both directions, thus in the sense of positive and negative changes in the propagation of the torsion wave to the waveguide can be compensated.

According to an embodiment of the present invention, a position calculation unit is provided to ascertain the position on the basis of the period of time between the disconnect edge signal of the excitation pulse and the reply pulse. Through reference to the disconnect edge signals, it is guaranteed that a change in the duration of the excitation pulse, especially shortening or lengthening it, also has an influence on the ascertained position.

Furthermore, according to an embodiment of the present invention, the position calculation unit is provided to conduct the ascertainment of the position on the basis of the duration using a standardized rate of propagation of the torsion wave on the waveguide. This is possible without further ado since (as was explained), the correction has already been conducted in the framework of generating the excitation pulse. The conversion of the duration into the position of the object can therewith be conducted extremely simply and rapidly.

Moreover, an embodiment of the present invention provides that the reel generates a signal, and that the position calculation unit is provided to recognize a deflection of the signal called forth by the torsion wave and to generate the reply pulse as a function of this deflection. Advantageously the generation of the reply pulse takes place as a function of a zero line of the signal furnished by the reel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
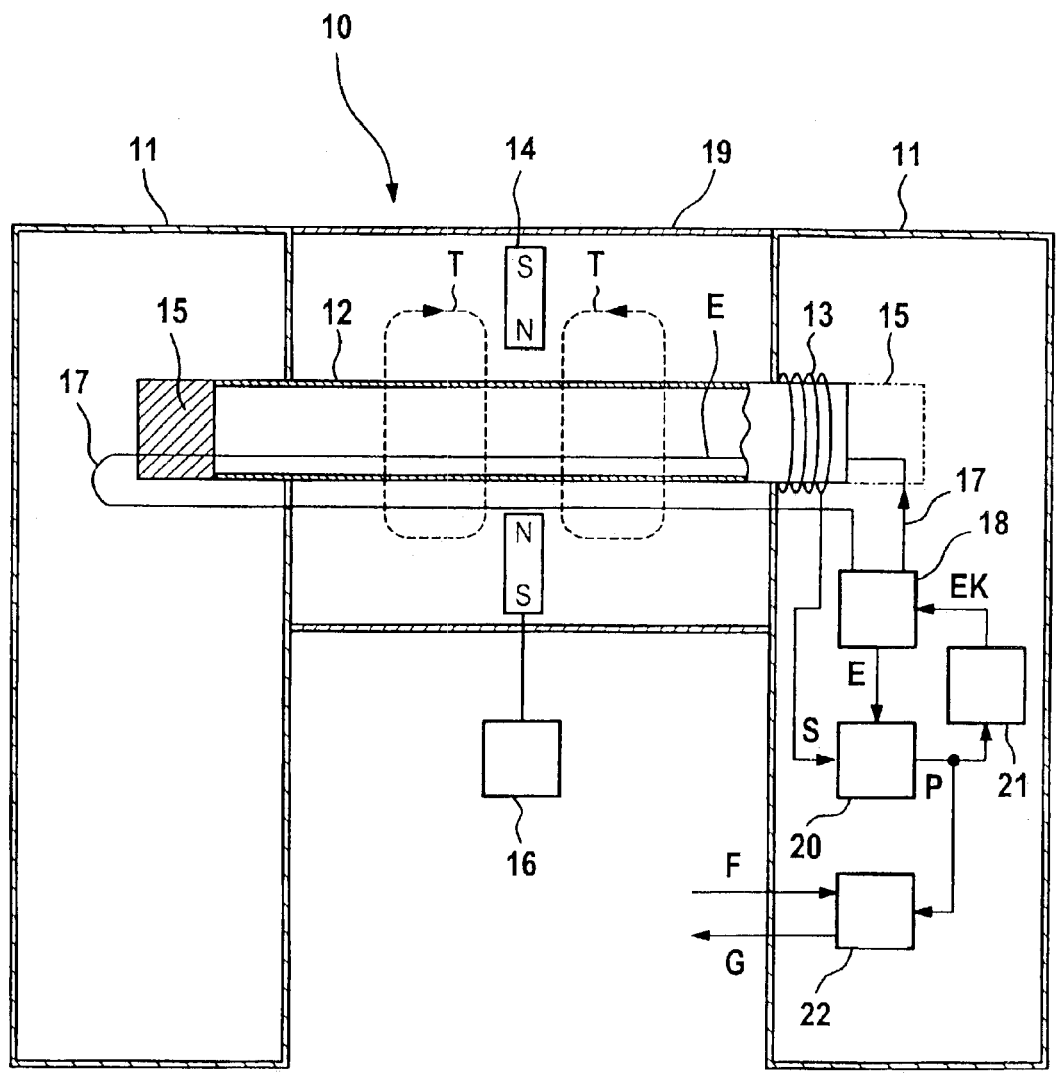
FIG. 1 illustrates a schematic circuit diagram of an embodiment of a magnetostrictive position measuring system according to the present invention.

FIG. 1 illustrates a magnetostrictive position measuring system 10 which has a housing 11, a waveguide 12, a reel 13 and a magnet 14.

The waveguide 12 consists of magnetostrictive material and is constructed rod-like. The reel 13 is arranged in the region of the one end of the waveguide 12. The reel 13 encircles the waveguide 12 without touching the latter. A damper 15 is provided in the region of the other end of the waveguide 12. In addition, a further damper 15 can be present in that region of the waveguide 12 in which the reel 13 is arranged.

The magnet 14 can be slid in the direction of the waveguide 12. The magnet 14 is connected with an object 16 so that the position of the magnet 14 along the waveguide 12 corresponds to the position of the object 16.

A conductive wire 17 is connected with a pulse generator 18. The wire 17 extends through the interior of the entire length of the waveguide 12 and is conducted back on the exterior of the waveguide 12 to the pulse generator 18 again. The waveguide 12, the conductive wire 17, the reel 13 and the magnet 14 are accommodated in a cylindrical housing 19.

Alternatively there exists the possibility of combining the waveguide 12 and the conductive wire 17 as a common component.

The pulse generator 18 is connected with a position calculating unit 20 to which the reel 13 is furthermore connected. A processor 21 is available which is connected with the position calculating unit 20 and with the pulse generator 18. Furthermore, a start/stop generator 22 is connected to the processor 21.

During the operation of the magnetostrictive position measuring system 10, the pulse generator 18 periodically generates an individual excitation pulse E, for example every 2 milliseconds. The duration of the excitation pulse E amounts to a few microseconds, for example 4.5 microseconds.

The excitation pulse E runs through the conductive wire 17 in the direction toward the magnet 14. When the excitation pulse E reaches the magnetic field of magnet 14, a torsion wave T arises in the waveguide 12. The excitation pulse E is furthermore forwarded to the position calculation unit 20.

The torsion wave T is propagated proceeding from the position of the magnet 14 in both directions of the waveguide 12. When the torsion wave T reaches the reel 13, a signal S arises. Otherwise the torsion wave T is dampened with the aid of damper 15 so that no reflections or the like arise at the ends of waveguide 12.

Consequently, the excitation pulse E and signal S are available in the position calculation unit. The position calculation unit first generates a reply pulse A on the basis of signal S, as this will be described subsequently.

Figure 2:
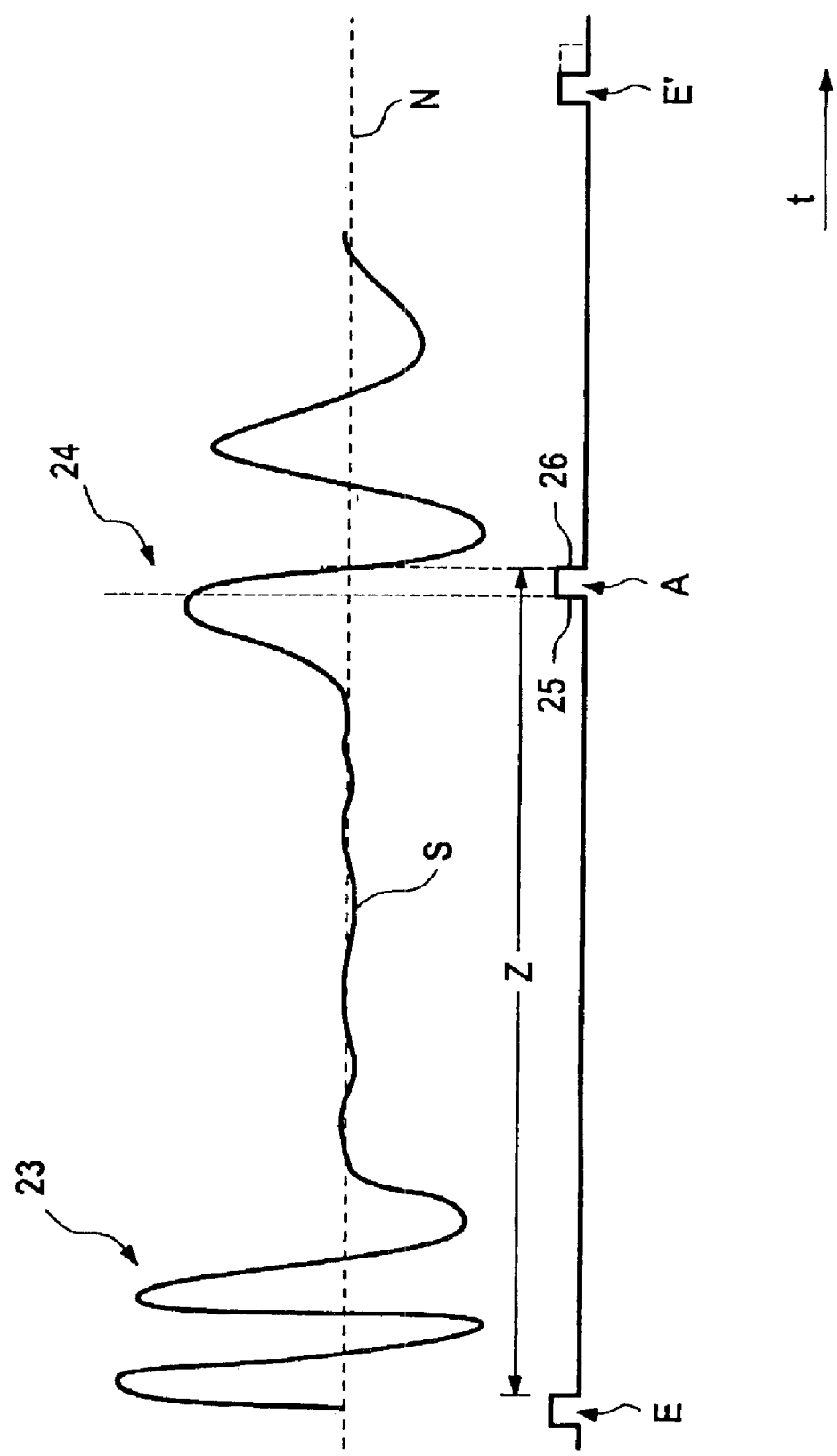
FIG. 2 illustrates a schematic diagram of signal generated by the position measuring system of FIG. 1 with associated excitation pulse and reply pulse.

FIG. 2 shows a diagram with signal S, excitation pulse E and reply pulse A and a next excitation pulse E', in each case plotted over time t.

As was explained, the excitation pulse E runs through the waveguide 12. Furthermore the excitation pulse E also passes through the reel 13. This leads to disturbances 23 of signal S which are masked out by the position calculation unit 20 through corresponding measures.

Likewise as explained, the torsion wave T is called forth by the excitation pulse E which generates a deflection 24 of signal S in reel 13. This deflection 24 is recognized by the position calculation unit 20 and is not masked out.

Ascertaining and generating the reply pulse A is conducted by the position calculation unit 20. For example, when signal S reaches a maximum at deflection 24, the connection edge signal 25 of reply pulse A is generated. Furthermore, a zero line of signal S is known in the position calculation unit 20. As soon as signal S is reaches this zero line N again after the connect edge signal 25, the disconnect edge signal 26 of reply pulse A is generated.

Time Z is converted by the position calculation unit 20 with the aid of a known, standardized propagation rate of the torsion wave T inside waveguide 12 into a position P of the object 16. This position P is forwarded to the processor 21. For this reason, a digitizing of position P takes place.

A memory is present in processor 21, for example an EEPROM (=electronically erasable programmable read only memory). A table is contained in the memory in which the positions of the object 16 and respective associated excitation pulse correction values EK are stored.

The positions and associated correction values are ascertained in advance using a calibration. For this, the object 16 is brought into a large number of positions along waveguide 12. The positions are on the one hand ascertained using the previously described method. On the other hand, the positions are additionally measured by a highly exact measuring device, for example a laser interferometer. The correction value is ascertained on the basis of the deviation of the highly exactly measured position and the position ascertained with the aid of the present method. This correction value is (as mentioned) digitally stored in the table together with the associated position for all measured positions.

As mentioned, the position P ascertained by the position calculating unit 20 is forwarded to the processor 21. The processor 21 reads the associated excitation pulse correction value EK directly out of the stored table as a function of this position value.

Alternatively, it is possible for the processor 21 to conduct an advance calculation of the current position using several positions P last obtained by the position calculating unit 20. With this alternative, it is consequently taken into account that ascertaining the last position P through the position calculated unit 20 requires a certain period of time in which the object 16 if need be moves further and therewith has changed its position. Moreover, the motion of the objection 16 can be ascertained from the last positions in order therewith then to conduct the advance calculation mentioned, for example with the aid of a linear extrapolation. The processor 21 reads the associated excitation pulse correction value 18 out of the stored table for the resulting current position.

The excitation pulse correction value EK is thereupon output analog to the impulse generator 18 which therewith shortens or lengthens the next excitation pulse E' shown in FIG. 2. The lengthening or shortening of this excitation pulse E' using the excitation pulse correction value EK can moreover take place in multiples of 0.2 nanoseconds, for example.

The deviation described of the position of the object 16 ascertained according to the present method from the highly exactly measured position of the same results, among other things, from the fact that the waveguide 12 possesses no homogenous properties over its entire length. Hence no linear correlations between the actual positions of the object 16 and the positions of the object 16 measured by the magnetostrictive position measuring system 10 on the basis of material changes and/or manufacture-conditioned inexactitudes. The standardized propagation rate of the torsion wave T used in converting the duration Z into position P for this reason does not exactly agree with the actual conditions on the wave guide 12.

The correction of this deviation takes place through the fact that the duration of the in any given case next excitation pulse E' is altered. The duration of an excitation pulse E has an effect on the torsion wave T resulting from it and therewith on the reply pulse A. By lengthening or shortening the duration of an excitation pulse, deviations of the magnetostrictive position measuring system 10 can therewith be equalized with reality.

Independently of this, for example, the time Z up to the arrival of the reply pulse A automatically becomes shorter through lengthening an excitation pulse E. Such a lengthening is represented in dotted lines by way of example in connection with the next excitation pulse E' in FIG. 2.

Overall, the inherently present non-linear character of the waveguide 12 is therewith corrected by a change in the duration of the excitation pulse E. In other words, this means that it is not the result of the measurement which is corrected, thus the period of time Z, but rather the trigger for the measurement, namely the excitation pulse E. This has as a consequence that the result of the measurement, thus the period to time Z, is already corrected, and for this reason no needs to be corrected.

With the time Z ascertained on the basis of the excitation pulse E and the reply pulse A, it is therewith a matter of a corrected value. The like consequently also applies for the position P of object 16 calculated on the basis of it.

During the operation of the magnetostrictive system 10, the positions P of the object 16 ascertained by the position calculation unit 20 are also forwarded to the start/stop generator 22. There a majority of successive positions P are stored.

If henceforth the start/stop generator 22 is acted upon by an externally generated interrogation pulse F with which the position of the object 16 is queried, then the start/stop generator 22 generates a start/stop impulse G as a function of the stored position P of the object 16.

The interrogation pulse F can arrive temporally completely independently of the excitation pulses E and/or the reply pulses A at the start/stop generator 22. This has as a consequence that when the interrogation impulse F arrives, normally no position P is stored which exactly corresponds to that position Q of the object 16 which this in fact occupies at the time of the arrival of the reply pulse F.

For this reason, an advanced calculation is conducted in the start-stop generator 22. The motion of the object 16 along the waveguide 12 are ascertained on the basis of the positions P of the object 16 stored prior to the arrival of the interrogation pulse F. Moreover, its rate of travel along waveguide 16 is especially taken into consideration. From this motion of the object 16, that position Q of the object 16 is inferred which the latter actually has at the time the interrogation impulse F actually arrives.

Ascertaining that position Q of the object 16 which the latter actually has at the time the interrogation impulse F arrives can, for example, be conducted with the aid of a linear extrapolation or also using other mathematical methods.

The position Q of the object 16 ascertained in this manner at the time the interrogation pulse F arrives is then transformed by the start/stop generator 22 into a period of time. The start/stop generator 22 finally generates a start impulse and a stop impulse whose temporal interval corresponds to the aforementioned period of time.

The start impulse is moreover generated by the start/stop generator 22 immediately after the interrogation pulse F arrives and output externally. Then the start/stop generator 22 conducts the explained advance calculation. It can be attained through a corresponding construction of the start/stop generator 22 that conducting this advanced calculation is always shorter in time than the above mentioned time characterizing position Q. In this way, it is possible that the start/stop generator 22 first calculates the aforementioned time in order then to generate correspondingly and externally output the stop impulse which together with the already output start impulse represents the period of time mentioned.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetostrictive position measuring method, comprising:

ascertaining a position of a magnet in which the magnet is movable along a waveguide;

passing an excitation pulse via the waveguide to the magnet, whereby a torsion wave arises in the waveguide when the excitation pulse reaches the magnet;

generating a reply pulse as a function of the torsion wave;

ascertaining the position of the magnet as a function of the excitation pulse and the reply pulse;

allocating a large number of positions and excitation pulse correction values to one another; and changing a duration of a next excitation pulse as a function of the ascertained position of the magnet and the associated excitation pulse correction value from a table.

2. The position measuring method according to claim 1, wherein the duration of the next excitation pulse is shortened or lengthened.

3. The position measuring method according to claim 2, wherein the position is ascertained on the basis of a time between a disconnect edge signal of the excitation pulse and the reply pulse.

4. The position measuring method according to claim 2, wherein a signal is generated, and wherein a deflection of the signal is recognized and the reply pulse is generated as a function of this deflection.

5. The position measuring method according to claim 1, wherein the position is ascertained on the basis of a time between a disconnect edge signal of the excitation pulse and the reply pulse.

6. The position measuring system according to claim 5, wherein ascertaining the position is conducted on the basis of the duration by way of a standardized propagation rate of the torsion wave on the wave guide.

7. The position measuring method according to claim 5, wherein a signal is generated, and wherein a deflection of the signal is recognized and the reply pulse is generated as a function of this deflection.

8. The position measuring method according to claim 1, wherein a signal is generated, and wherein a deflection of the signal is recognized and the reply pulse is generated as a function of this deflection.

9. A magnetostrictive position measuring system, comprising:

a waveguide to which a magnet which is moveable along the waveguide is allocated;

an impulse generator for generating an excitation pulse;

a conductive wire for guiding the excitation pulse through the waveguide to the magnet, whereby a torsion wave arises in the waveguide when the excitation pulse reaches the magnet;

a reel for generating a reply pulse as a function of the torsion wave;

a position calculation unit for ascertaining the position of the magnet as a function of the excitation pulse;

a processor is provided in which a table is present in which a large number of positions and excitation pulse correction values are allocated to one another, whereby resources are provided which alter a duration of a next excitation pulse as a function of the ascertained position of the magnet and the associated excitation pulse correction value from the table.

10. The position measuring system according to claim 9, wherein resources for shortening or lengthening the duration of the next excitation pulse are provided.

11. The position measuring system according to claim 10, wherein the position calculation unit is provided to ascertain the position on the basis of the time between the disconnect edge signal of the excitation pulse and the reply pulse.

12. The position measuring system according to claim 10, wherein the reel generates a signal, and wherein the position calculation unit is provided to recognize a deflection of the signal and to generate the reply pulse as a function of this deflection.

13. The position measuring system according to claim 9, wherein the position calculation unit is provided to ascertain the position on the basis of the time between the disconnect edge signal of the excitation pulse and the reply pulse.

14. The position measuring system according to claim 13, characterized in that the position calculating unit is provided for ascertaining the position on the basis of time using a standardized propagation rate of the torsion wave on the waveguide.

15. The position measuring system according to claim 13, wherein the reel generates a signal, and wherein the position calculation unit is provided to recognize a deflection of the signal to generate the reply pulse as a function of this deflection.

16. The position measuring system according to claim 9, wherein the reel generates a signal, and wherein the position calculation unit is provided to recognize a deflection of the signal to generate the reply pulse as a function of this deflection.

* * * * *